US012170827B2

(12) United States Patent
Aher et al.

(10) Patent No.: US 12,170,827 B2
(45) Date of Patent: *Dec. 17, 2024

(54) SYSTEMS AND METHODS FOR INSERTING EMOTICONS WITHIN A MEDIA ASSET

(71) Applicant: Adeia Guides Inc., San Jose, CA (US)

(72) Inventors: Ankur Anil Aher, Maharashtra (IN); Charishma Chundi, Andhra Pradesh (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,213

(22) Filed: Sep. 14, 2023

(65) Prior Publication Data

US 2024/0007719 A1 Jan. 4, 2024

Related U.S. Application Data

(63) Continuation of application No. 17/861,446, filed on Jul. 11, 2022, now Pat. No. 11,792,489, which is a continuation of application No. 17/077,541, filed on Oct. 22, 2020, now Pat. No. 11,418,850, and a continuation of application No. 17/077,539, filed on Oct. 22, 2020, now Pat. No. 11,418,849.

(51) Int. Cl.
| | |
|---|---|
| *H04N 21/488* | (2011.01) |
| *G06V 20/40* | (2022.01) |
| *H04N 21/466* | (2011.01) |
| *H04N 21/475* | (2011.01) |
| *H04N 21/81* | (2011.01) |
| *G06F 16/683* | (2019.01) |

(52) U.S. Cl.
CPC ........ *H04N 21/4884* (2013.01); *G06V 20/41* (2022.01); *H04N 21/4667* (2013.01); *H04N 21/4755* (2013.01); *H04N 21/8146* (2013.01); *G06F 16/685* (2019.01)

(58) Field of Classification Search
CPC .......... H04N 21/4884; H04N 21/4667; H04N 21/4755; H04N 21/8146; G06K 9/00718; G06F 16/685
See application file for complete search history.

(56) References Cited

U.S. PATENT DOCUMENTS

| | | | |
|---|---|---|---|
| 7,761,892 B2 | 7/2010 | Ellis et al. | |
| 9,681,165 B1 | 6/2017 | Gupta et al. | |
| 11,418,849 B2 * | 8/2022 | Aher | H04N 21/4884 |
| 11,418,850 B2 * | 8/2022 | Aher | H04N 21/8146 |
| 11,792,489 B2 * | 10/2023 | Aher | G06F 16/784 |
| | | | 348/462 |
| 2010/0225807 A1 | 9/2010 | Mears | |
| 2015/0350740 A1 * | 12/2015 | Itakura | H04N 21/41265 |
| | | | 725/46 |
| 2017/0310927 A1 * | 10/2017 | West | G06T 13/80 |

(Continued)

*Primary Examiner* — Kyu Chae
(74) *Attorney, Agent, or Firm* — Haley Guiliano LLP

(57) ABSTRACT

Systems and methods are described herein for inserting emoticons within a media asset based on an audio portion of the media asset. Each audio portion of a media asset is associated with a respective part of speech, and an emotion corresponding to the audio portion for the media asset is determined. A corresponding emoticon is identified based on the determined emotion in the audio portion and causing to be presented at the location within the media asset.

17 Claims, 7 Drawing Sheets

(56) References Cited

U.S. PATENT DOCUMENTS

| | | |
|---|---|---|
| 2018/0035938 A1 | 2/2018 | El Kaliouby et al. |
| 2019/0373336 A1 | 12/2019 | Kim et al. |
| 2020/0051582 A1* | 2/2020 | Gilson ................. H04N 21/233 |
| 2020/0312280 A1 | 10/2020 | Ahmed |
| 2021/0030308 A1* | 2/2021 | Grace .................... A61B 5/486 |
| 2021/0160581 A1* | 5/2021 | Difrancesco ....... H04N 21/4884 |
| 2022/0132217 A1 | 4/2022 | Aher et al. |
| 2022/0132218 A1 | 4/2022 | Aher et al. |
| 2023/0007359 A1 | 1/2023 | Aher et al. |

* cited by examiner

300

| | Time | Subtitle | Emotion | Emoticon |
|---|---|---|---|---|
| 304 | 00:15:18 → 00:15:28 | Thank you very much for the help | Happy | 😊 |
| 306 | 00:18:24 → 00:18:31 | 308 Why did you do that?? | 310 Angry | 312 😠 |
| | 00:21:12 → 00:21:18 | I just lost all my belongings. | Crying | 😢 |
| | 00:14:02 → 00:14:04 | I just adopted a puppy. | In love | 😍 |
| | 01:35:42 → 01:35:49 | He got the promotion again | unamused | 😒 |
| | 00:35:48 → 00:36:02 | His pants ripped. | Tears of joy | 😂 |
| | 00:05:12 → 00:05:08 | I ate all of your Halloween candy. Just kidding! | Just Kidding | 😛 |
| | 00:23:14 → 00:23:18 | Ugh.... | Rolling Eyes | 🙄 |

SYSTEMS AND METHODS FOR INSERTING EMOTICONS WITHIN A MEDIA ASSET

CROSS-REFERENCE TO RELATED APPLICATIONS

This application is a continuation of U.S. patent application Ser. No. 17/861,446, filed Jul. 11, 2022, which is a continuation of U.S. patent application Ser. Nos. 17/077,541 and 17/077,539, filed Oct. 22, 2020, now U.S. Pat. Nos. 11,418,850 and 11,418,849 respectively. The disclosure of which are hereby incorporated by reference herein in their entireties.

BACKGROUND

This disclosure relates to inserting emoticons within a media asset and, more particularly, inserting emoticons within scenes of the media asset.

SUMMARY

With movies in many different languages, users are more frequently employing subtitles while consuming such movies in different languages. Typically, subtitles include direct translation of the dialogues or transcript or screenplay in a language selected by the user. Such direct translations and subtitles associated with the translation cannot convey the actor's emotion when quickly presented during the consumption of the movie. For example, an actor gesturing while also saying "Gracias" in Spanish may be translated to "thank you," and a subtitle may be presented. However, such a translation and associated subtitle lack the actor's gesture, for example, a sarcastic indication, or a happy indication or an angry indication. Further, when consuming content with subtitles, the consumer often focuses their attention on the location where the subtitles appear on display and often misses the actor's facial expressions or gestures during each scene of the media asset. Thus, the translation does not allow the consumer to appreciate the actor's reaction and diminishes the consumer's experience of the movie. Even further, the placement of the subtitles on the screen causes the user to be distracted, which leads to a user not paying attention to the scenes and potentially missing essential parts of the movie.

Systems and methods are disclosed herein for improving emotions conveyed over conventionally translated subtitles by inserting an emoticon or an emoji into a subtitle of a media asset for display as part of the subtitle of the media asset. In order to provide this improvement, a media guidance application identifies text or sound or facial expressions during the scene that relate to an emotion, mentioned in the subtitles of program annotations of a media asset or uttered by actors in the scene. Systems and methods select emoticons or emojis associated with that specific text or sound. Such emoticon or emoji can then be inserted as part of the media asset's subtitle or into the display frame of the scene near the actor making the sound or conveying the emotion. As users generally focus on the subtitles when watching a media asset, an emoticon displayed by the media guidance application as part of the media asset's subtitle can improve a user's consumption of the media asset in an inexpensive and efficient way.

Specifically, a media guidance application may obtain an audio portion and subtitle data corresponding to a media asset and identify a keyword from the subtitle data that needs improvement or clarification via an emoticon. The media guidance application may then determine whether the identified keyword relates to an emotion corresponding to an emoticon by searching an emoticon database. In response to determining that the identified keyword relates to the emotion corresponding to the emoticon, the media guidance application may determine a location to insert the emoticon into media asset. In some embodiments, the media guidance application may cause the subtitles and the emoticon to be presented together. The emotion may be determined based on various factors, such as facial and body expressions, words in the dialogue, tone of the dialogue, and background music. The emoticon corresponding to the emotion may be determined based on various factors. For example, in one embodiment, the emoticon may be chosen based on available display capacity at the subtitle region within a media asset's video frame. In another example, the emoticon may be selected from the emoticon database based on semantic context matching of the subtitle data, as further described below. Further, the media guidance application may then generate for display, at the subtitle region or another location of the media asset's video frame, the first subtitle data including the determined emoticon. By inserting emoticons based on the keywords and other factors, the media guidance application may more precisely convey the emotion than conventional systems that rely on simple translations in the subtitle data.

The media guidance application may insert emoticons into the subtitles of a live program or a previously stored media asset. Specifically, the media guidance application may obtain media guidance data indicating the availability of a plurality of media assets and determine, based on the media guidance data, that certain media asset is likely to be played at a later time.

The media guidance application may then obtain subtitle data corresponding to the media asset or may determine the subtitle data based on the audio portion of the media asset. Specifically, the media guidance application may receive metadata corresponding to the media asset and determine from the metadata whether subtitle data is available. For example, in response to determining from the metadata that subtitle data is unavailable, the media guidance application may buffer and delay the playback of a portion of the received media asset in order to generate subtitle data for the buffered portion. The media guidance application may perform a speech-to-text recognition of an audio portion corresponding to the buffered portion. In another example, by determining whether subtitle data is available from the metadata, the media guidance application may determine whether or not subtitle data, within which emoticons will be placed, needs to be generated.

The media guidance application may identify one or more emotions from the subtitle data as possible candidates relating to emoticons. For example, the media guidance application may choose words, or a combination of words, facial and body expressions, sound tone, background music and any other factors or a combination thereof, from the scenes of the media asset to identify the emotion of mood of a scene and/or the like. Specifically, the media guidance application may compare the subtitle data with a plurality of emotions and the emoticon database associated with specific emotions. The media guidance application may determine, from the subtitle data, that a word or a combination of words and other factors from the first subtitle data at least partially match an emotion from the plurality of emotions. For example, a subtitle line of "Thank you for helping," which is translated from "Gracias por ayudarme" contains the combination of words "thank you" and "helping" as well as the facial expressions of the actors that match with a happy emotion. For example, by using keywords from the subtitle data as possible candidates relating to an emotion, the media guidance application may more precisely target the subtitle having emotions than conventional systems that rely on providing a simple translation.

For each identified keyword from the first subtitle data, the media guidance application may then determine an emoticon to annotate the respective keyword. For example, the media guidance application may annotate the subtitle line "Thank you for helping" with a happy emoticon. In some embodiments, emoticons may be used alone to convey an emotion that is not spoken. For example, with no subtitles present, an emotion expressed on the screen may be enhanced by the use of an emoticon displayed on the screen to convey the emotion.

The media guidance application may select an emoticon to insert into a subtitle line when the subtitle line contains keywords that match different emotions. For example, the subtitle line "Ugh, he got the promotion again" may contain keywords "ugh" and "he got the promotion" that both match with different emotions. In this case, the media guidance application may select one emoticon to annotate the subtitle line to avoid too many annotations in a single subtitle line. Specifically, the media guidance application may rank a set of emoticons from queries corresponding to the one or more keywords in the subtitle data based on each relevance level corresponding to each respective emotion.

In some embodiments, the media guidance application may rank the keyword-matched emotions based on user interests in the emoticons. Specifically, the media guidance application may retrieve a user profile corresponding to a user who is likely to play back the media asset and obtain one or more key terms indicating user interests from the user profile. For example, the user profile may include user interest indicators such as sports, tennis, soccer, drama, and/or the like and the emotions associated with such interests. For example, a user interested in dramas may be associated with suspenseful emoticons, such as emoticons for being scared, anxious, waiting, or any other suitable emoticon. The media guidance application may then compare one or more key terms with a set of emotions and identify a similarity between the respective emotions and the one or more key terms indicating user interests. The media guidance application may then assign a respective relevance level to each emotion based on the similarity. For example, when the media guidance application identifies an emotion for "tears of joy" in the subtitle line, "his pants ripped," and an emoticon for tears of joy is inserted into the subtitle line. In this case, the media guidance application may assign a high relevance level to the emotions of funny, or something so amusing that it produces tears of joy because it matches user interest.

In some embodiments, the media guidance application may rank the keyword matched to an emotion based on the emoticon availability to the specific location where the user is located. Specifically, the media guidance application may determine a location where the media asset is likely to be played back. For example, the media guidance application may determine the location of household user equipment, the location of a user's mobile device where the media asset is played, and/or the like. For each emoticon from the set of emotions, the media guidance application may assign a relevance level to the emotions based on the emoticons' availability to the location. For example, in response to determining that a respective emoticon corresponding to the respective emotion is exclusively available in the location, the media guidance application may assig the highest relevance level to the respective emotion. For another example, in response to determining that the respective product corresponding to the respective emotion is available across different locations, the media guidance application may assign a medium relevance level lower than the highest relevance level to the respective emotion. In response to determining that the respective emoticon corresponding to the respective emotion is unavailable in the location, the media guidance application may assign the respective emotion's lowest relevance level. In some embodiments, some emoticons may not be appropriate based on the age of the user. For example, some emoticons may be overly violent or insensitive, and when the user is a child who is watching a media asset under parental control, the parental control system may determine that the emoticon is appropriate.

In some embodiments, the media guidance application may select an emotion with the highest relevance level from the set of emotions as a candidate to insert emoticons corresponding to the emotion into the subtitle data. Specifically, the media guidance application may determine an emoticon from the selected emotion based on available display time and space corresponding to the subtitle data at a subtitle region within a media asset's video frame. For example, the media guidance application may curb the original subtitle text to fit the subtitle display region's available space on the screen. In some embodiments, the media guidance application may select an emotion having the highest relevance level from the set of emotions, as a candidate to insert emoticons corresponding to the emotion within a video frame of the media asset.

The media guidance application may generate, for display at the subtitle region of the media asset's video frame, the first subtitle data having the determined emotion. In some embodiments, the media guidance application may calculate an emotion score to determine if an emoticon is necessary to enhance the viewing experience. For example, the media guidance application may consider a facial expression of an actor of the media asset; a body movement of an actor in the media asset; words in a dialogue in the audio portion of the media asset; a tone of the dialogue in the audio portion of the media asset; and background music in the audio portion of the media asset. Each of the considerations has a weighted value to arrive at a total emotion score. In an example, in response to the emotion, the score is too low, i.e., the emotion is not properly presented during the video presentation. The system may search for an appropriate emoticon based on the emotion in the specific audio portion of the media asset, and upon identifying the emoticon, it may insert the emoticon into the scene to enhance the viewing experience. The inserted emoticon may be into the subtitle line or near the characters conveying the emotion. For example, if a character is making a statement in the media asset and the emotion is determined to be lacking from the subtitles, an emoticon is inserted in the video frame of the media asset for the duration of the video frame. The duration is not limited and may be the length of the scene where the emotion is lacking.

In some embodiments, the media guidance application may insert an emoticon between subtitle lines when there is sufficient time between the subtitle lines. Specifically, the media guidance application may retrieve a tag-out time corresponding to a first subtitle line, and a tag-in time corresponding to a second subtitle line after the first subtitle line. The media guidance application may then determine a duration between the first subtitle line's tag-out time and the tag-in time of the second subtitle line. In response to determining that the duration is greater than a threshold, the media guidance application may insert the determined emoticon between the first subtitle line and the second subtitle line for display between the tag-out time corresponding to the first subtitle line and the tag-in time corresponding to the second subtitle line. For example, if the media guidance application has determined that there is sufficient time after the subtitle line "Thank you for helping" before the next subtitle line is to be displayed, the media guidance application may generate and display the emoticon for "Thank you for helping" at the subtitle region between the subtitle line and the next subtitle line. For example, by inserting an emoticon between subtitle lines when there is sufficient time between the subtitle lines, the media guidance application ensures that the subtitles stay synchronized with the media asset even after the emoticon is inserted.

In some embodiments, the media guidance application may format the emoticon in a different color or font size for display with the subtitle so that the audience can distinguish the emoticon from the subtitle text. In some embodiments, the media guidance application may generate an audio file along with the inserted emoticon. For example, when a "Happy emoticon" is inserted with the subtitle line "Thank you for helping", the media guidance application may generate an audio file corresponding to the emoticon to supplement the original audio track of the media asset, or may generate an audio file corresponding to the new subtitle line. For example, formatting the subtitle line, the media guidance application may ensure that the emoticon is not confused with and/or stands out from the subtitles' text to better capture the viewer's attention.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 provides an example diagram illustrating a listing of subtitles, emotions and emoticons corresponding to the emotion, according to embodiments described herein;

DETAILED DESCRIPTION

Figure 1:
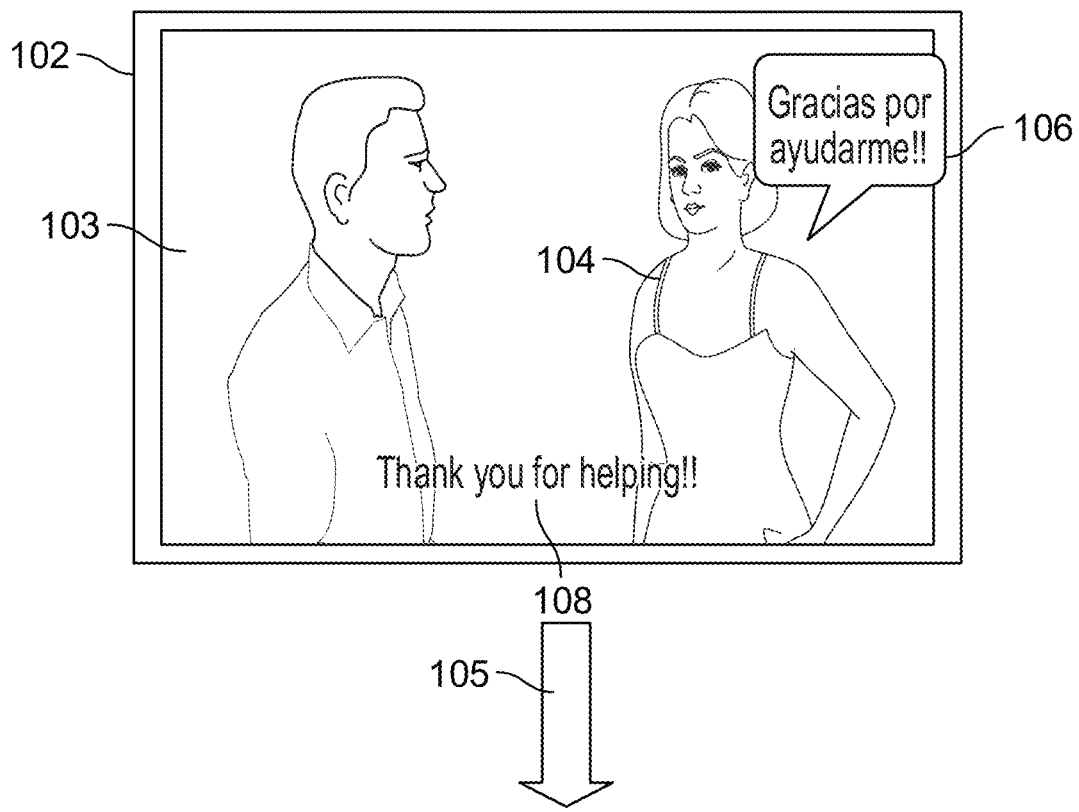
FIG. 1 provides an example diagram illustrating user equipment displaying a media asset having an emoticon displayed within the displayed subtitle line of the media asset, according to embodiments described herein.
Figure 1:
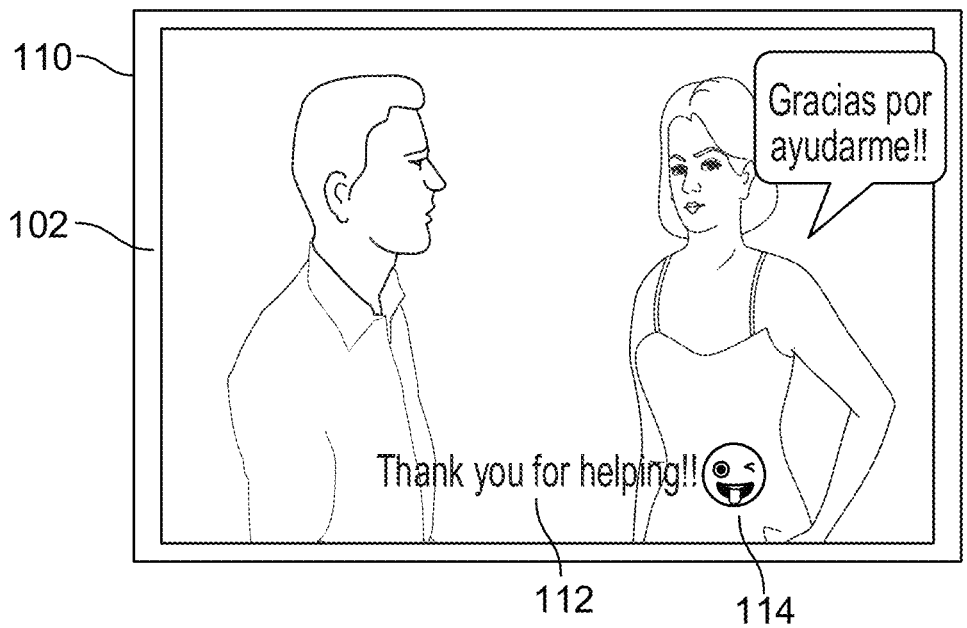

Systems and methods are disclosed herein for inserting an emoticon into a media asset for display as part of the subtitle of the media asset. Embodiments described herein provide a way to insert emoticons or emojis into the subtitle of the media asset based on the emotions portrayed in an audio portion of the media asset. Specifically, a media guidance application, which is implemented at a set-top box of user equipment, may be used to analyze the metadata corresponding to the media asset to identify emotions based on facial and body expressions, keywords in the dialogue, tone of the dialogue, and background music. From the identified emotions of the audio portion of the media asset, the media guidance application may associate emoticons with the specific emotion conveyed in the audio portion of the media asset and not expressed in the text of the subtitle. For example, when the subtitle translation is generic and doesn't convey an emotion, the subtitle needs to be enhanced to convey the appropriate emotion of the audio portion of the media asset. The media guidance application enhances the emotions conveyed in the subtitle by inserting an emoticon corresponding to the missing emotions. Such emoticons may be inserted into the subtitles for display as part of the asset's subtitle. As users generally pay attention to the subtitle when watching a media asset, an emoticon displayed as part of the media asset's subtitle can reach a user inexpensively and efficiently.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable users to navigate, locate, and select content. As referred to herein, the terms "media asset" and "content item" should be understood to mean electronically consumable user assets, such as television programming, as well as pay-per-view programs, on-demand programs (as in VOD systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices and part of a live performance.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory (RAM), etc.

It is to be noted that embodiments described herein may be implemented by a media guidance application implemented on a set-top box or any other application that receives media guidance data and that can be configured to communicate with a set-top box remotely.

With the advent of the Internet, mobile computing, and high-speed wireless networks, users are accessing media on user equipment devices on which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front-facing screen and a rear-facing screen, multiple front screens, or multiple angled screens. In some embodiments, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters"or providers" logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

FIG. 1 provides an example diagram illustrating user equipment displaying a media asset having an emoticon displayed within the displayed subtitle line of the media asset, according to embodiments described herein. FIG. 1 shows user equipment 100 which may include a step-top box, on which the media guidance application is implemented. The screen 102 of user equipment 100 may display an interactive media guidance application, which may cause the display of a media asset 103 to the audience users. While the media asset 103 is being displayed on the screen 102, subtitle or caption 108, corresponding to the media asset sound 106, may be displayed, e.g., within a subtitle region within the video frame of the media asset 103.

The media guidance application via an emotion module 105 may insert emoticons into the subtitle of a live program or a previously stored media asset. For example, as shown at 110 in FIG. 1, when the subtitle line 112 includes an emoticon 114 conveying a happy emotion may be displayed as a supplement to the subtitle. To identify words from the subtitle line and select an emoticon to insert into the subtitle line, the media guidance application retrieves data corresponding to a media asset, and analyzes the subtitle data to identify keyword as candidates to pair with previously stored emoticons.

First, the media guidance application may obtain media guidance data indicating the availability of a plurality of media assets, and determine, based on the media guidance data, a media asset that is likely to be played at a later time. For example, the media guidance application may read a program schedule listing a channel that a user is viewing and determine the media asset to be aired next. In another example, the media guidance application may retrieve a viewing history corresponding to a user profile and predict a channel that the user may likely watch later, e.g., a television show that the user regularly follows. In another example, the media guidance application may identify a program that the user may likely watch at the transmission time based on popularity of the program, e.g., the number of users who have scheduled recordings of the program, the amount of electronic messages such as social media posts that relate to the program, and/or the like.

In another example, the media guidance data may also include an inventory of previously stored media assets (e.g., previous recordings made by the user), on-demand programs, and/or the like. The media guidance application may then identify a media asset that has been recently stored or made available, a media asset that the user has started viewing but has not finished, a media asset that the user has added to a watch list, a media asset that has been watched by a friend or a social influencer to the user, and/or the like, as the media asset that the user may likely watch at a later time.

The media guidance application may then obtain subtitle data corresponding to the identified media asset that the user may watch later. In some embodiments, as part of the subtitle data, the media guidance application may obtain data pertaining to emotions expressed throughout the media asset. Specifically, the media guidance application may receive metadata corresponding to the media asset, and determine whether subtitle data is available from the metadata. For example, the media guidance application may retrieve a subtitle data file from the metadata, e.g., similar to 302 in FIG. 3. The subtitle data file includes a list of subtitle lines, and for each a subtitle line, a tag-in time (e.g., start time) of the subtitle line (e.g., the playback position when the display of the subtitle line will start) and a tag-out time (e.g., end time) of the subtitle line (e.g., the playback position when the display of the subtitle line will end), an emotion of the subtitle line and a corresponding emoticon. In another example, in response to determining that subtitle data is unavailable from the metadata, the media guidance application may generate subtitle data from the media asset. For instance, when the media asset is a previously stored media asset, the media guidance application may retrieve an audio file corresponding to the media asset and perform speech-to-text recognition to generate a text subtitle file. For another example, when the media guidance application receives the media asset 103 from live programming of a linear source, the media guidance application may buffer and delay the playback of a portion of the received media asset 103 to generate subtitle data for the buffered portion, e.g., by performing speech-to-text recognition of an audio file corresponding to the buffered portion.

The media guidance application may then identify one or more keywords from the subtitle data as possible candidates relating to an emotion. For example, the media guidance application may choose words, or a combination of words, from the subtitle that relate to an emotion, and based on the identified emotion, further identify a corresponding emoticon. For example, as shown in FIG. 3, words or phrases from the subtitle data such as "Why did you do that?" may relate to the previously stored angry emoticon. For another example, keywords from the subtitle data such as "I just adopted a puppy" and/or the like may be identified as candidates for the in-love emoticon because these words may match with the emoticon definition.

Figure 4:
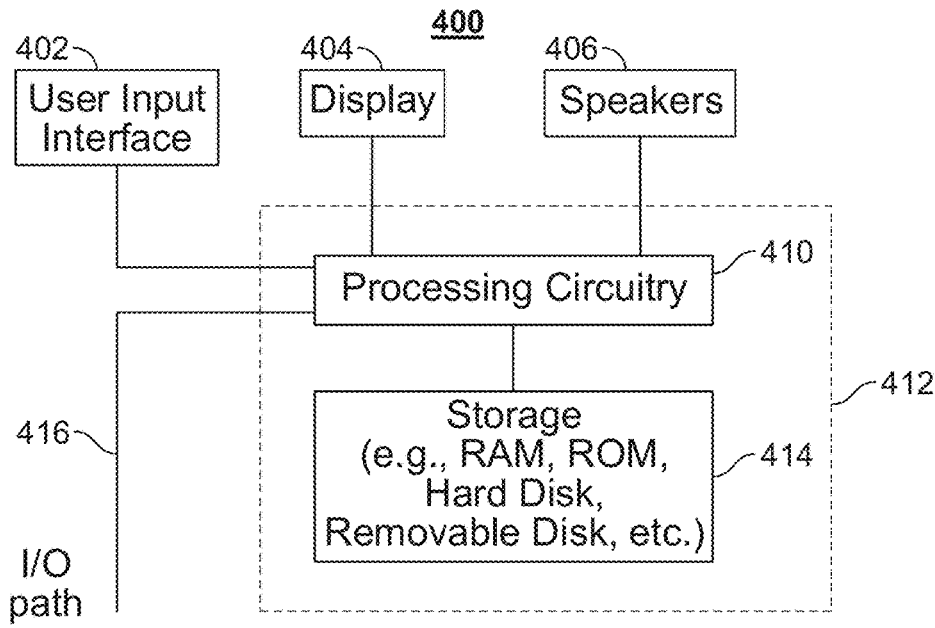
FIG. 4 is a block diagram of an illustrative user equipment (UE) device in accordance with some embodiments of the disclosure.
Figure 5:
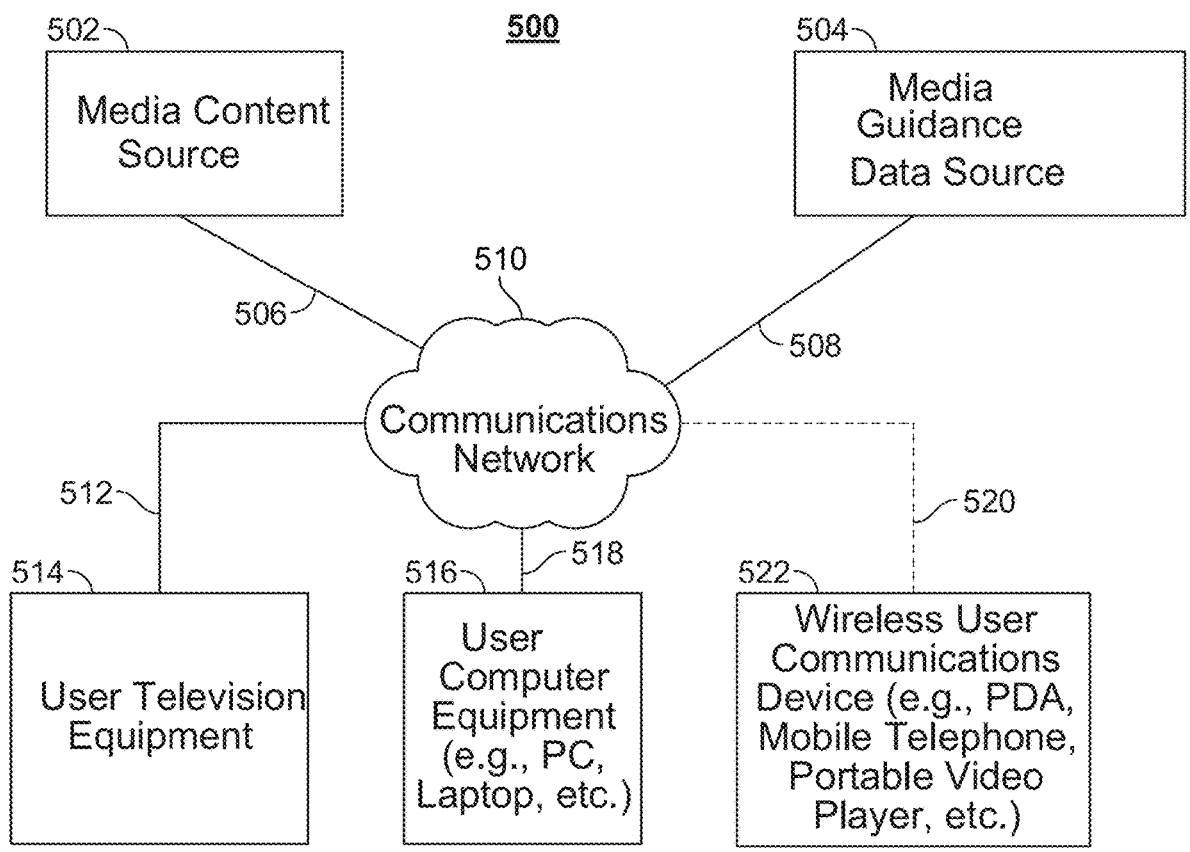
FIG. 5 is a block diagram of an illustrative media system in accordance with some embodiments of the disclosure.

Specifically, to identify the one or more emoticons as possible candidates relating to emotion missing from the translated subtitles, the media guidance application may compare the subtitle data with a plurality of emoticons from a emoticon database module, e.g., at storage 414 in FIG. 4 or media data content source 502 in FIG. 5 via communications network 510. The media guidance application may determine, from the subtitle data, that a word or a combination of words from the first subtitle data at least partially matches an emoticon from the plurality of emoticons. For example, a subtitle line of "Thank you for helping" contains the combination of words when summed attempt to convey a happy tone, yet that is not clear through the subtitle text.

For each identified keyword from the first subtitle data, the media guidance application may then determine an emotion to annotate the respective keyword. For example, the media guidance application may annotate the subtitle line "Thank you for helping" with a visual effect of a happy emoticon to highlight that the happy emoticon may be inserted into the media asset.

Specifically, to determine the emoticon, the media guidance application may transmit a query based on the respective identified keywords and other factors to the emoticon database storing emoticons information relating to a plurality of emotions. For example, as described above, the emoticon database may be housed at storage 414 in FIG. 4, or media data content source 502 accessible via communications network 510 in FIG. 5. Each entry of the emoticon database may identify an emoticon linked to nouns, adjectives, and adverbs, which have been associated with the emotion as descriptive of the emoticon. For example, in some embodiments, the media guidance application may update entries of the emoticon database to supplement words or a combination of words that are to be associated with an emoticon.

In response to the transmitted query, the media guidance application may obtain a query result indicating the respective identified keyword matches an emoticon corresponding to an emotion. For example, the keyword, e.g., the combination of words "Thank you for helping" from the subtitle, matches an emoticon.

In some embodiments, the media guidance application may select an emoticon to insert into a subtitle when the subtitle contains keywords that match with different emotion factors. For example, the subtitle line "I just lost all my belongings" may contain keywords "lost" and "all" that when combined, match with a crying emoticon. If the phrase also corresponds to a second emoticon, for example, an angry emoticon, the system may need to prioritize and insert only one emoticon based on limited space. In this case, the media guidance application may insert the crying emoticon into the subtitle. Or alternatively, the media guidance application may select one emoticon to annotate the subtitle line, to avoid too many annotations in a single subtitle line. Specifically, the media guidance application may rank a set of emoticons from queries corresponding to the one or more keywords in the subtitle data based on each relevance level corresponding to each respective emoticon.

In some embodiments, the media guidance application may rank the keyword-matched emoticons based on the significance of the keywords in the context of the subtitle line. For example, for the subtitle of "I just adopted a puppy," which contains words "adopted" and "puppy" both matching with emoticons, the media guidance application may determine which emoticon to insert, e.g., depending on which word matches with the respective emoticon to a higher degree. Specifically, for each keyword that matches with a respective emoticon, the media guidance application may determine an overlapping portion between the respective keyword and the respective emoticon and a non-overlapping portion not included in the respective keyword from the respective emoticon. The media guidance application may then analyze the overlapping portion and the non-overlapping portion in the context of the respective emoticons to determine whether one emoticon matched the emotion more than another emoticon.

In some embodiments, the media guidance application may rank the keyword-matched emoticons based on user interests in the emoticon. Specifically, the media guidance application may retrieve a user profile corresponding to a user who is likely to play back the media asset, and obtain one or more key terms indicating user interests from the user profile. For example, the user profile may include user interest indicators such as sports, tennis, soccer, drama, cars, and/or the like. Specifically, the media guidance application may compare the one or more key terms with a set of emoticons and identify a similarity between a respective emoticon and the one or more key terms indicating user interests. The media guidance application may then assign a respective relevance level to each emoticon based on the similarity. For example, the words that match with an emoticon may be assigned with a higher relevance level because they share a similarity with the user interest of dramas or romantic movies. Based on identifying the emoticon, the media guidance application inserts the emoticon into the subtitle to enhance the user's viewing experience by displaying emotions on the screen.

In some embodiments, the media guidance application may display the emoticons that are keyword-matched emoticons based on the emoticon's availability to be displayed in a specific location in the video frame to not interfere with the main content. Specifically, the media guidance application may determine that the media asset may not have space for the emoticon's insertion and instead insert the emoticon in the standard subtitle location. For example, the media guidance application may determine that the speaker of the dialogue is not present on the video frame, that the video frame includes a quick scene change, or that the insertion of an emoticon would deteriorate the aesthetics of the video frame.

In some embodiments, the media guidance application may display the emoticon in the subtitle. The emoticon may be inserted at any point in the emoticon, for example, in the beginning, middle or end of the phrase, as determined based on availability of space in the subtitle. In some embodiments, the emoticon may be inserted based on available space on the video frame of the media asset. For example, available space is space that does not cover actors or possible action scenes as a possible insertion location. In another embodiment, the media guidance application may insert emoticons based on parental control parameters. For example, the media guidance application may determine that certain emoticons need to be avoided. For example, in response to determining that, based on parental control, certain scary emoticons should be avoided, the media guidance application may assign the lowest relevance level to the respective emoticons and will avoid inserting such emoticons.

In some embodiments, the media guidance application may rank the emotions based on a combined emotion score of each emotion in the audio portion of the media asset. For example, the media guidance application may compute a weighted sum of the emotion score based on the degree of dialogue, facial and body expressions, tone of dialogue and background music as described above. The weighted sum corresponding to each emotion may be used as the metric to identify emotions conveyed in a subtitle or audio portion of a media asset. Thus, subtitles that generate a high emotion score, or a score above a threshold value, translate to the subtitles conveying the emotion. On the other hand, subtitles that generate a low emotion score, or a score below a threshold value, translate to the subtitle lacking the emotion.

In some embodiments, for subtitles that lack emotion, the media guidance application may then select an emoticon corresponding to the lacking emotion as a candidate to insert into the subtitle data. Specifically, the media guidance application may determine an emoticon from the identified emotion based on available display time and space corresponding to the subtitle data at a subtitle region within a video frame of the media asset.

The media guidance application may generate for display, at the subtitle region of the video frame of the media asset, the first subtitle data having the determined emoticon. In some embodiments, the media guidance application may insert an emoticon in line into a subtitle line subject to the available display area of the subtitle region. For example, as shown in FIG. 1, the selected emoticon 114 may be inserted into the subtitle line 112, and be formatted with a different color or size to be distinguished from the original subtitle line.

In some embodiments, the media guidance application may curb the emoticon to fit the available space of the subtitle display region on the screen. Specifically, the media guidance application may determine only a certain size emoticon may fit on the screen. The media guidance application may retrieve a maximum number of characters of the subtitle region, e.g., a maximum of 50 characters. The media guidance application may determine a difference in the maximum number of characters and the first amount of characters, e.g., remaining space of 14 characters for displaying an inserted emoticon. The media guidance application may determine a position within the subtitle data for inserting the determined emoticon based on a corresponding emotion from the subtitle data that relates to the emoticon. In the above example, the happy emoticon is to be inserted after the words "Thank you for helping" The media guidance application may then insert the determined emoticon into the first subtitle data at the determined position, e.g., "Thank you for helping" and the happy emoticon.

Figure 2:
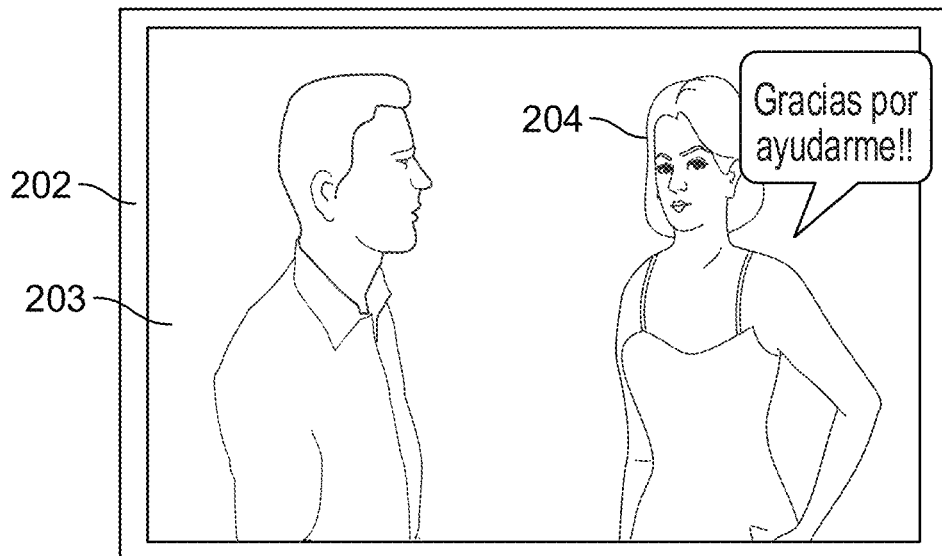
FIG. 2 provides an example diagram illustrating user equipment displaying a media asset having an emoticon displayed within the frame of the displayed media asset, according to embodiments described herein.
Figure 2:
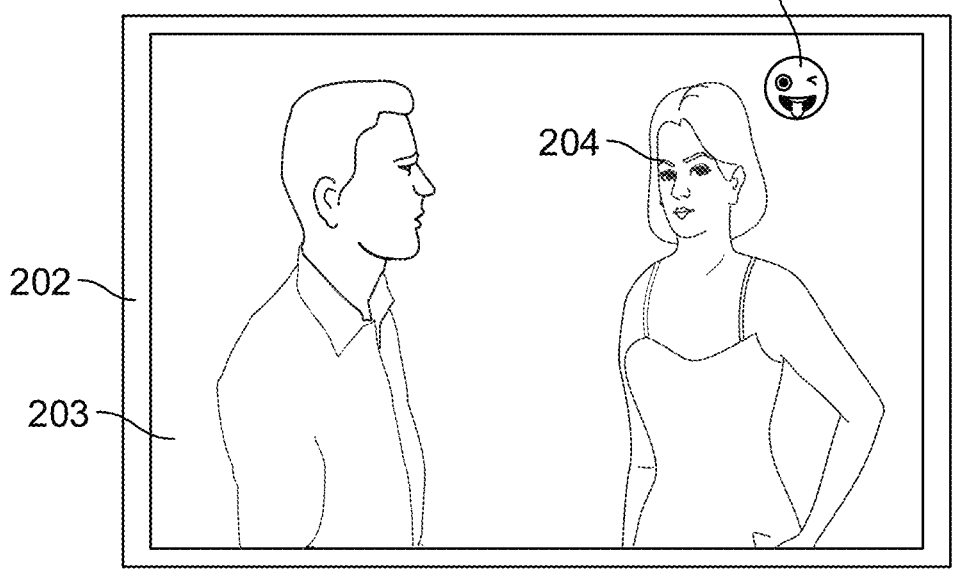

FIG. 2 provides an example diagram illustrating user equipment displaying a media asset having an emoticon displayed within the displayed media asset, according to embodiments described herein. FIG. 2 shows user equipment 200 that may include a step-top box, on which the media guidance application is implemented. The screen 202 of user equipment 200 may display an interactive media guidance application, which may cause the display of a media asset 203 to the audience users. While the media asset 203 is being displayed on the screen 202, the emotions are not clearly conveyed by the source. In some embodiments, the media guidance application may insert an emoticon near the source of the emotion. For example, it may insert the emoticon near the actor conveying the emotion. In the above example, the actress making a statement does not convey the emotion. As a result, the media guidance application may identify the emotion lacking and insert an emoticon 210 into the frame of the media asset 203 to enhance the viewing experience.

Specifically, the media guidance application may retrieve a tag-in time corresponding to a start of the utterance of the phrase and a tag-out time corresponding to an end of the utterance of the phrase. Further, as shown in FIG. 2, at frame 250, the media guidance application may then determine a duration between the tag-out time of the first subtitle line and the tag-in time of the second subtitle line. Further, the media guidance application may determine a location for inserting the emoticon into the video frame of the media asset. Based on the determined location and duration, the media guidance application may insert the emoticon into the video frame.

In some embodiments, in response to determining that the emotion is not properly conveyed, the media guidance application may optionally insert an emoticon into the media asset's frame during the duration of the emotion not being properly conveyed. The emoticon may be inserted anywhere in the frame of the video portion of the media asset. In some embodiments, the emoticon is inserted in media asset's frame for the duration of time between the tag-out time of the first subtitle line and the tag-in time of the second subtitle line.

In some embodiments, in response to determining that the duration is shorter than a threshold, the media guidance application may optionally modify the video frame of the media asset to extend the duration for inserting the emoticon. In some embodiments, in response to determining that no suitable location is available, the media guidance application may optionally modify the video frame of the media asset to extend the duration for inserting the emoticon.

In some embodiments, as the inserted emoticon may change the display size of the subtitle area, the media guidance application may determine an appropriate display position of the emoticon not to overlap with an informative object in the video. For example, when the media asset corresponds to a football match, the media guidance application may determine the location of the football within each video frame to ensure the displayed emoticon does not interfere with the image of the football. Specifically, the media guidance application may retrieve a tag-in time and a tag-out time corresponding to the first subtitle data and retrieve a video frame from the media asset to be displayed between the tag-in time and the tag-out time. The media guidance application may then determine a first portion of the video frame that relates to an informative object, and then determine a second portion of the video frame for displaying the first subtitle data modified by the determined emoticon without overlapping the first portion of the video frame. For example, the media guidance application may identify the object of a "football" in the media asset, and track the movement trajectory of the "football" such that when an emoticon is inserted into the video frame, the media guidance application may ensure that the display of the emoticon does not overlap with the image of the football. Further description of determining a portion relating to an informative object can be found in commonly owned U.S. Pat. No. 9,681,165, which is hereby expressly incorporated by reference herein in its entirety.

FIG. 3 provides an example diagram illustrating modifying a subtitle file to include emoticons, according to embodiments described herein. Block 302 shows the original subtitle file that includes a list of subtitle entries (e.g., 304). Each subtitle entry 304 includes a textual subtitle line (e.g., 308), each of which is to be displayed within a subtitle region of the media asset's video frame tag-in time and a tag-out time (e.g., 306). For example, the media guidance application may identify an emotion 310 from the subtitle line 304 as a candidate based on which to select and insert an emoticon. For another example, the media guidance application may identify emotions such as "angry," "happy," "crying" and/or the like as candidates based on which to select and insert an emoticon, from the subtitle file 302.

In some embodiments, the media guidance application may format the emoticon in a different color or size for display with the subtitle so that the audience can distinguish the emoticon from the subtitle text. In some embodiments, the media guidance application may generate, or retrieve from local or cloud storage (e.g., storage 414 in FIG. 4 or media data guidance data source 504 in FIG. 5), an audio file along with the inserted emoticon. Specifically, the media guidance application may replace an audio segment of the media asset corresponding to a duration between the second tag-in time and the second tag-out time by the generated or the retrieved audio file, and play the generated or the retrieved audio file corresponding to the determined emoticon in place of the audio segment while the media asset is being played during the duration between the second tag-in time and the second tag-out time.

In some embodiments, the media guidance application may determine the display time for the subtitle line with the emoticon. For example, the media guidance application may retrieve a first tag-in time, e.g., 00:18:24, and a first tag-out time corresponding to the first subtitle data, e.g., 00:18:31 for the subtitle line 308. The media guidance application may insert the determined angry emoticon at a corresponding keyword that is related to the emotion in the first subtitle data or replace the corresponding keyword with the emoticon. With the changed display text, the media guidance application may estimate a second tag-in time and a second tag-out time corresponding to the emoticon within the first subtitle data. When the duration of a subtitle line's display time is determined by the number of characters in the subtitle line, the required duration for display of the subtitle line 308 may be prolonged due to the inserted emoticon. Thus, the required second tag-in time or the second tag-out time may not be the same as the first tag-in time and the first tag-out time, respectively. In this case, the media guidance application may adjust the tag-in or tag-out time to prolong the display time of the subtitle line 308.

Within some embodiments, the media guidance application may perform the emoticon insertion as described in FIGS. 1-3 offline by analyzing a subtitle file (similar to 302 in FIG. 3), before displaying the media asset. In other embodiments, the media guidance application may perform the emoticon insertion by adjusting the tag-in or tag-out time to display the subtitle lines modified with emoticon insertion or replacement and/or the like, as described in FIGS. 1-3, in real time while the media asset is being streamed from a media source, and/or being played.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (I/O) path 416. I/O path 416 may provide content (e.g., broadcast programming, on-demand programming, Internet content, content available over a local area network (LAN) or wide area network (WAN), and/or other content) and data to control circuitry 412, which includes processing circuitry 410 and storage 414. Control circuitry 412 may be used to send and receive commands, requests, and other suitable data using I/O path 416. I/O path 416 may connect control circuitry 412 (and specifically processing circuitry 410) to one or more communication paths (described below). I/O functions may be provided by one or more of these communication paths, but are shown as a single path in FIG. 4 to avoid overcomplicating the drawing.

Control circuitry 412 may be based on any suitable processing circuitry such as processing circuitry 410. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 412 executes instructions for a media guidance application stored in memory (i.e., storage 414). Specifically, control circuitry 412 may be instructed by the media guidance application to perform the functions discussed above and below. For example, the media guidance application may provide instructions to control circuitry 412 to generate the media guidance displays. In some implementations, any action performed by control circuitry 412 may be based on instructions received from the media guidance application.

In client/server-based embodiments, control circuitry 412 may include communications circuitry suitable for communicating with a guidance application server or other networks or servers. The instructions for carrying out the above-mentioned functionality may be stored on the guidance application server. Communications circuitry may include a cable modem, an integrated service digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 414 that is part of control circuitry 412. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 414 may be used to store various types of content described herein as well as media guidance data described above. Nonvolatile memory may also be used (e.g., to launch a boot-up routine and other instructions). Cloud-based storage, described in relation to FIG. 5, may be used to supplement storage 414 or instead of storage 414.

Control circuitry 412 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 412 may also include scaler circuitry for upconverting and downconverting content into the preferred output format of the user equipment device 400. Control circuitry 412 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including the tuning, video generating, encoding, decoding, encrypting, decrypting, scaler, and analog/digital circuitry, may be implemented using software running on one or more general-purpose or specialized processors. Multiple tuners may be provided to handle simultaneous tuning functions (e.g., watch and record functions, picture-in-picture (PIP) functions, multiple-tuner recording, etc.). If storage 414 is provided as a separate device from user equipment device 400, the tuning and encoding circuitry (including multiple tuners) may be associated with storage 414.

A user may send instructions to control circuitry 412 using user input interface 402. User input interface 402 may be any suitable user interface, such as a remote control, mouse, trackball, keypad, keyboard, touchscreen, touchpad, stylus input, joystick, voice recognition interface, or other user input interfaces. Display 404 may be provided as a stand-alone device or integrated with other elements of user equipment device 400. For example, display 404 may be a touchscreen or touch-sensitive display. In such circumstances, user input interface 402 may be integrated with or combined with display 404. Display 404 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 404 may be HDTV-capable. In some embodiments, display 404 may be a 3D display, and the interactive media guidance application and any suitable content may be displayed in 3D. A video card or graphics card may generate the output to the display 404. The video card may offer various functions such as the accelerated rendering of 3D scenes and 2D graphics, MPEG-2/MPEG-4 decoding, TV output, or the ability to connect multiple monitors. The video card may be any processing circuitry described above in relation to control circuitry 412. The video card may be integrated with the control circuitry 412. Speakers 406 may be provided as integrated with other elements of user equipment device 400 or may be stand-alone units. The audio component of videos and other content displayed on display 404 may be played through speakers 406. In some embodiments, the audio may be distributed to a receiver (not shown), which processes and outputs the audio via speakers 406.

The guidance application may be implemented using any suitable architecture. For example, it may be a stand-alone application wholly implemented on user equipment device 400. In such an approach, instructions of the application are stored locally (e.g., in storage 414), and data for use by the application is downloaded on a periodic basis (e.g., from an out-of-band feed, from an Internet resource, or using another suitable approach). Control circuitry 412 may retrieve instructions of the application from storage 414 and process the instructions to generate any of the displays discussed herein. Based on the processed instructions, control circuitry 412 may determine what action to perform when input is received from user input interface 402. For example, movement of a cursor on a display up/down may be indicated by the processed instructions when user input interface 402 indicates that an up/down button was selected.

In some embodiments, the media guidance application is a client/server-based application. Data for use by a thick or thin client implemented on user equipment device 400 is retrieved on-demand by issuing requests to a server remote from the user equipment device 400. In one example of a client/server-based guidance application, control circuitry 412 runs a web browser that interprets web pages provided by a remote server. For example, the remote server may store the instructions for the application in a storage device. The remote server may process the stored instructions using circuitry (e.g., control circuitry 412) and generate the displays discussed above and below. The client device may receive the displays generated by the remote server and may display the content of the displays locally on user equipment device 400. This way, the processing of the instructions is performed remotely by the server while the resulting displays are provided locally on user equipment device 400. User equipment device 400 may receive inputs from the user via user input interface 402 and transmit those inputs to the remote server for processing and generating the corresponding displays. For example, user equipment device 400 may transmit a communication to the remote server indicating that an up/down button was selected via user input interface 402. The remote server may process instructions in accordance with that input and generate a display of the application corresponding to the input (e.g., a display that moves a cursor up/down). The generated display is then transmitted to user equipment device 400 for presentation to the user.

In some embodiments, the media guidance application is downloaded and interpreted or otherwise run by an interpreter or virtual machine (run by control circuitry 412). In some embodiments, the guidance application may be encoded in the ETV Binary Interchange Format (EBIF), received by control circuitry 412 as part of a suitable feed, and interpreted by a user agent running on control circuitry 412. For example, the guidance application may be an EBIF application. In some embodiments, the guidance application may be defined by a series of JAVA-based files that are received and run by a local virtual machine or other suitable middleware executed by control circuitry 412. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 400 of FIG. 4 can be implemented in system 500 of FIG. 5 as user television equipment 514, user computer equipment 516, wireless user communications device 522, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as stand-alone devices or may be part of a network of devices. Various network configurations of devices may be implemented and are discussed in more detail below.

A user equipment device utilizing at least some of the system features described above in connection with FIG. 5 may not be classified solely as user television equipment 514, user computer equipment 516, or a wireless user communications device 522. For example, user television equipment 514 may, like some user computer equipment 516, be Internet-enabled allowing for access to Internet content, while user computer equipment 516 may, like some user television equipment 514, include a tuner allowing for access to television programming. The media guidance application may have the same layout on various different types of user equipment or may be tailored to the display capabilities of the user equipment. For example, on user computer equipment 516, the guidance application may be provided as a website accessed by a web browser. In another example, the guidance application may be scaled down for wireless user communications device 522.

In system 500, there is typically more than one of each type of user equipment device, but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 514, user computer equipment 516, wireless user communications device 522) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 510. Namely, user television equipment 514, user computer equipment 516, and wireless user communications device 522 are coupled to communications network 510 via communication paths 512, 518, and 520, respectively. Communications network 510 may be one or more networks including the Internet, a mobile phone network, mobile voice or data network (e.g., a 4G or LTE network), cable network, public switched telephone network, or other types of communications network or combinations of communications networks. Paths 512, 518, and 520 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication paths or combination of such paths. Path 520 is drawn with dotted lines to indicate that in the exemplary embodiment shown in FIG. 5 it is a wireless path and paths 512 and 518 are drawn as solid lines to indicate they are wired paths (although these paths may be wireless paths, if desired). Communications with the user equipment devices may be provided by one or more of these communication paths but are shown as a single path in FIG. 5 to avoid overcomplicating the drawing.

Although communication paths are not drawn between user equipment devices, these devices may communicate directly with each other via communication paths, such as those described above in connection with paths 512, 518, and 520, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 510.

System 500 includes media data content source 502 and media guidance data source 504 coupled to communications network 510 via communication paths 506 and 508, respectively. Paths 506 and 508 may include any of the communication paths described above in connection with paths 512, 518, and 520. Communications with the media data content source 502 and media guidance data source 504 may be exchanged over one or more communication paths, but are shown as a single path in FIG. 5 to avoid overcomplicating the drawing. In addition, there may be more than one of each of media data content source 502 and media guidance data source 504, but only one of each is shown in FIG. 5 to avoid overcomplicating the drawing. (The different types of each of these sources are discussed below.) If desired, media data content source 502 and media guidance data source 504 may be integrated as one source device. Although communications between sources 502 and 504 with user equipment devices 514, 516, and 522 are shown as through communications network 510, in some embodiments, sources 502 and 504 may communicate directly with user equipment devices 514, 516, and 522 via communication paths (not shown) such as those described above in connection with paths 506 and 508.

Media data content source 502 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media data content source 502 may be the originator of content (e.g., a television broadcaster, a Webcast provider, etc.) or may not be the originator of content (e.g., an on-demand content provider, an Internet provider of content of broadcast programs for downloading, etc.). Media data content source 502 may include cable sources, satellite providers, on-demand providers, Internet providers, over-the-top content providers, or other providers of content. Media data content source 502 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 504 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 504 may be provided to users equipment using a client/server-approach. For example, a user equipment device may pull media guidance data from a server, or a server may push media guidance data to a user equipment device. In some embodiments, a guidance application client residing on the user's equipment may initiate sessions with media guidance data source 504 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 504 may provide user equipment devices 514, 516, and 522 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions that may be stored in storage 414, and executed by control circuitry 412 of a user equipment device 400. In some embodiments, media guidance applications may be client/server-applications where only a client application resides on the user equipment device, and a server application resides on a remote server. For example, media guidance applications may be implemented partially as a client application on control circuitry 412 of user equipment device 400 and partially on a remote server as a server application (e.g., media guidance data source 504) running on control circuitry of the remote server. When executed by control circuitry of the remote server (such as media guidance data source 504), the media guidance application may instruct the control circuitry to generate the guidance application displays and transmit the generated displays to the user equipment devices. The server application may instruct the control circuitry of the media guidance data source 504 to transmit data for storage on the user equipment. The client application may instruct control circuitry of the receiving user equipment to generate the guidance application displays.

Content and/or media guidance data delivered to user equipment devices 514, 516, and 522 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 516 or wireless user communications device 522 having a content capture feature. Alternatively, the user can first transfer the content to a user equipment device, such as user computer equipment 516. The user equipment device storing the content uploads the content to the cloud using a data transmission service on communications network 510. In some embodiments, the user equipment device itself is a cloud resource, and other user equipment devices can access the content directly from the user equipment device on which the user stored the content.

Figure 6:
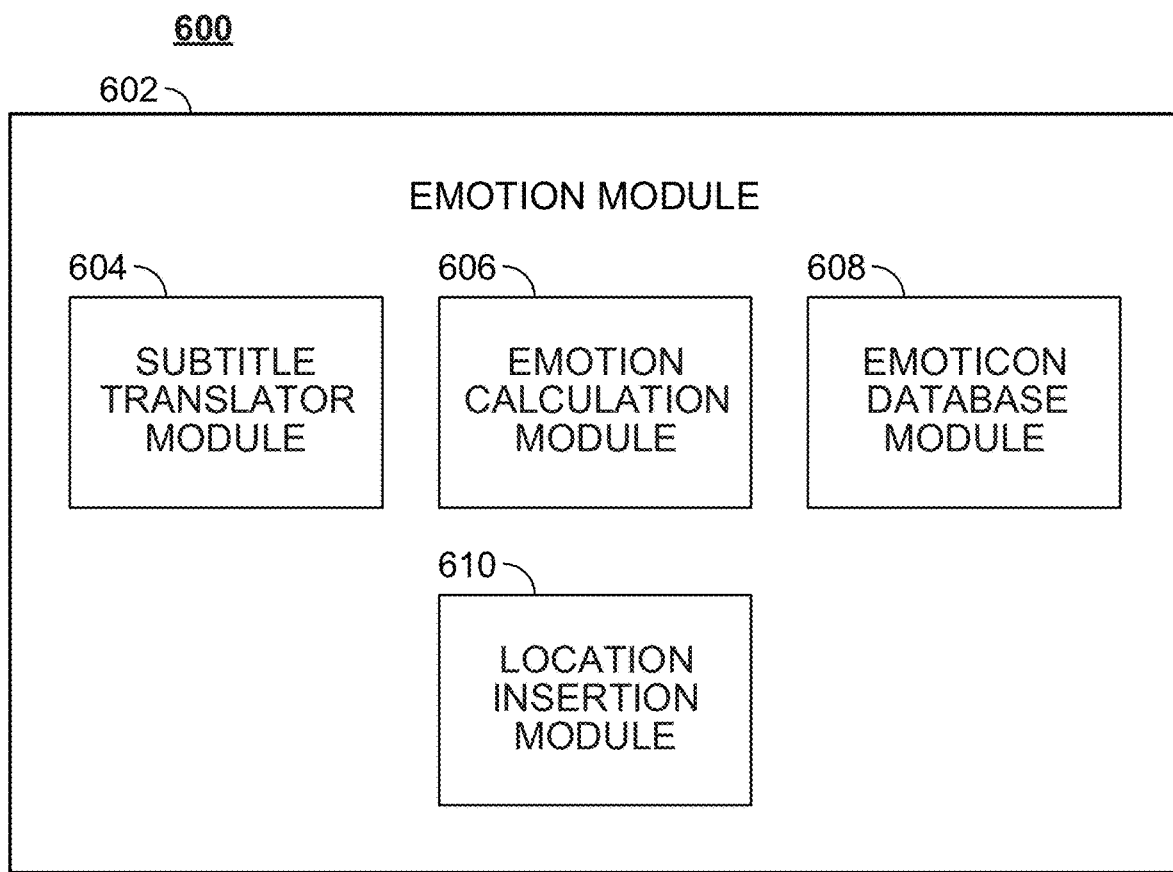
FIG. 6 is a block diagram of an emotion module, in accordance with some embodiments of the disclosure.

FIG. 6 illustrates an example emotion module 602, according to an embodiment of the present disclosure. In some embodiments, the emotion module 105 of FIG. 1 can be implemented as the example emotion module 602. As shown in FIG. 6, the emotion module 602 can include a subtitle translator module 604, an emotion calculation module 606, an emoticon database module 608, and a location insertion module 610.

The subtitle translator module 604 can be configured to translate media assets sound content into a subtitle. For example, a movie is presented in a language not understood by the consumer, and the consumer activates the translated subtitles in the language selected by the user. The system presents the translated subtitles to the consumer. As discussed herein, translated subtitles may be generated by a machine learning device. The machine learning device can translate the sounds from the media asset. Further, the machine learning device can identify key translation elements that may need an emotion booster to improve the translation.

The emotion calculation module 606 can be configured to determine emotions conveyed in the media asset that may be missing from the subtitles. The system considers factors such as, for example, one or more of the actors' facial expressions in the media asset, the body expression of actors in the media asset, words in a dialogue in the audio portion of the media asset, a tone of the dialogue of the audio portion of the media asset, and the background music of the audio portion of the media asset. The factors can have quantitative values. In some embodiments, the values of the factors can be generated or determined based on a common value scale to facilitate comparisons between values for different factors. Text labels are discussed below in connection with the calculation of values for the factors. The discussion of text labels below is also applicable to subtitles/captions, titles, superimposed text, hashtags, and comments. As also discussed herein, factor values can be used in calculating a weighted score for an emotion.

The emotion calculation module 606 can quantify an emotion conveyed in the audio portion of the media asset based on factors described throughout this document. In some embodiments, the value of the emotion calculation module can be proportional between the emotion and descriptive text of the emoticon. In some embodiments, the similarity can be between the descriptive text of the emoticon and subtitles/captions. The language of the emotion can differ from the language of a text label of an emoticon. In this situation, the subtitle translator module 604 can perform automated translation.

The emoticon database module 608 can be configured to determine emoticons corresponding to the emotions identified in the emotions calculation module. For example, the emotion conveyed in the media asset may be missing from the subtitles. The language correlation factor can quantify an emotion of the plurality of emotions, i.e., a level of emotion being conveyed. The level (or value) of emotion being conveyed can be associated with an original language of the emoticon and default languages of social network connections of the user. Calculation of the value for the language correlation factor can include a determination of the quantity of the social network connections of the user whose default language is the same as the original language of the emoticon.

The location insertion module 610 can be configured to determine a location for inserting the emoticons into the video frame of the media asset. Upon identifying that an emoticon may enhance the emotion conveyed in the media asset, a location where to insert the emoticon is determined. In some embodiments, the emoticon is inserted into the subtitles. For example, at the end of the subtitle during the specific video frame. In another example, the emoticon may be inserted at any location in the subtitle. In another embodiment, the emoticon is inserted into the video frame of the media asset while not interfering with the video frame. For example, the emoticon may be slightly transparent. In another example, the emoticon may be inserted alongside the actor uttering the emotion.

Figure 7:
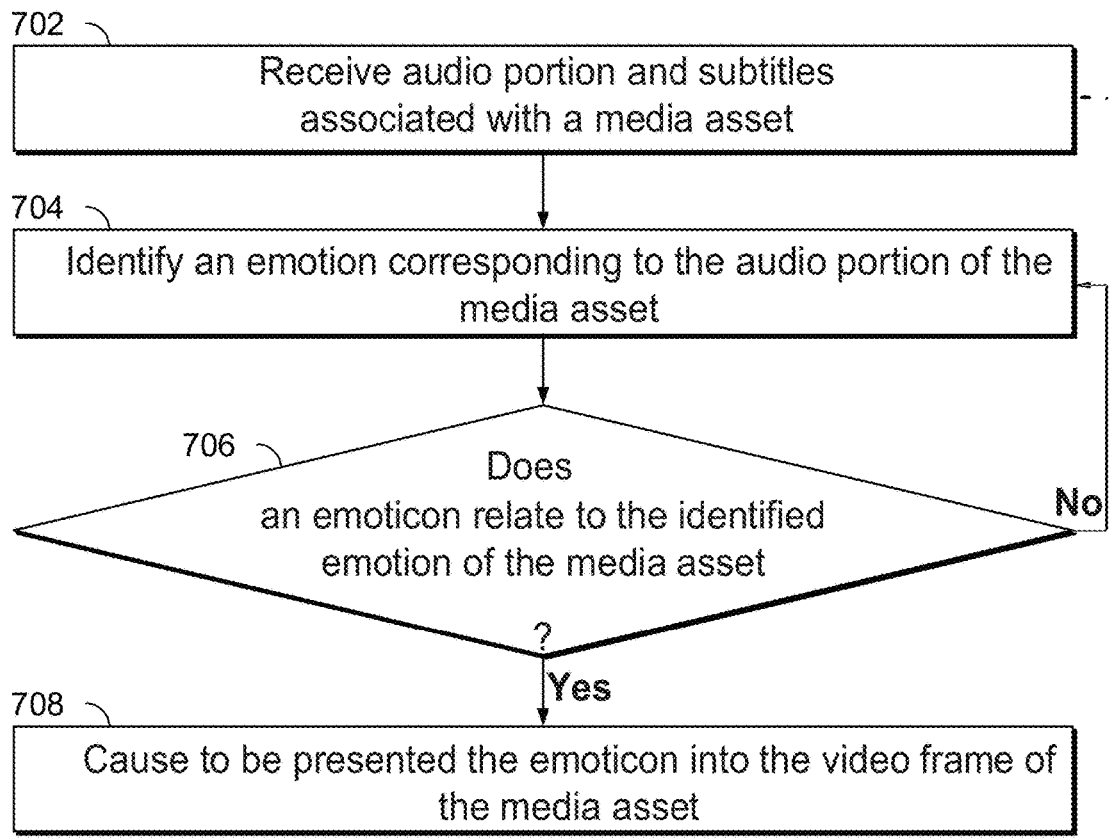
FIG. 7 depicts an illustrative flowchart of a process for inserting an emoticon into a media asset's subtitles, in accordance with some embodiments of the disclosure.

FIG. 7 depicts an illustrative flowchart of a process for inserting an emoticon into a media asset's subtitles, in accordance with some embodiments of the disclosure. Process 700 may be executed by control circuitry 412 (e.g., in a manner instructed to control circuitry 412 by the media guidance application). Control circuitry 412 may be part of user equipment (e.g., user equipment 102, which may have the functionality of any or all of user television equipment 514, user computer equipment 516, and/or wireless communications device 522), or of a remote server separated from the user equipment by way of communications network 510.

Process 700 begins at 702, where control circuitry 412 receives a media asset, e.g., from the media guidance data source 504 via communications network 510 in FIG. 5, which indicates the availability of a plurality of media assets. At 704, control circuitry 412, identifies, based on the media asset, an emotion corresponding to the audio portion of the media asset. For example, control circuitry 412 determines an emotion for each respective audio portion of the media asset by considering the actors' facial expressions and body expressions, dialogue in the video segment, tone of the dialogue, and background sound. At 706, control circuitry 412 determines an emoticon that relates to the emotion determined for each respective audio portion of the media asset. For example, control circuitry 412 obtains a subtitle data file (e.g., 302 in FIG. 3) from the media guidance data source 504 via a communications network 510 in FIG. 5 while receiving the transmission of the media asset. When the emotion corresponding to the audio portion of the media asset has been identified, process 700 proceeds to 706, where control circuitry 412 determines whether an emoticon relates to the identified emotion of the audio portion of the media asset. If not, at 706, when control circuitry 412 determines that no emoticon relates to the identified emotion of the audio portion of the media asset, process 700 repeats 704, where control circuitry 412 identifies an emotion of the audio portion of the media asset. At 708, control circuitry 412 generates for display, e.g., via the display circuitry 404 in FIG. 4, at the subtitle region of the video frame of the media asset, the first subtitle data including the determined emoticon.

Figure 8:
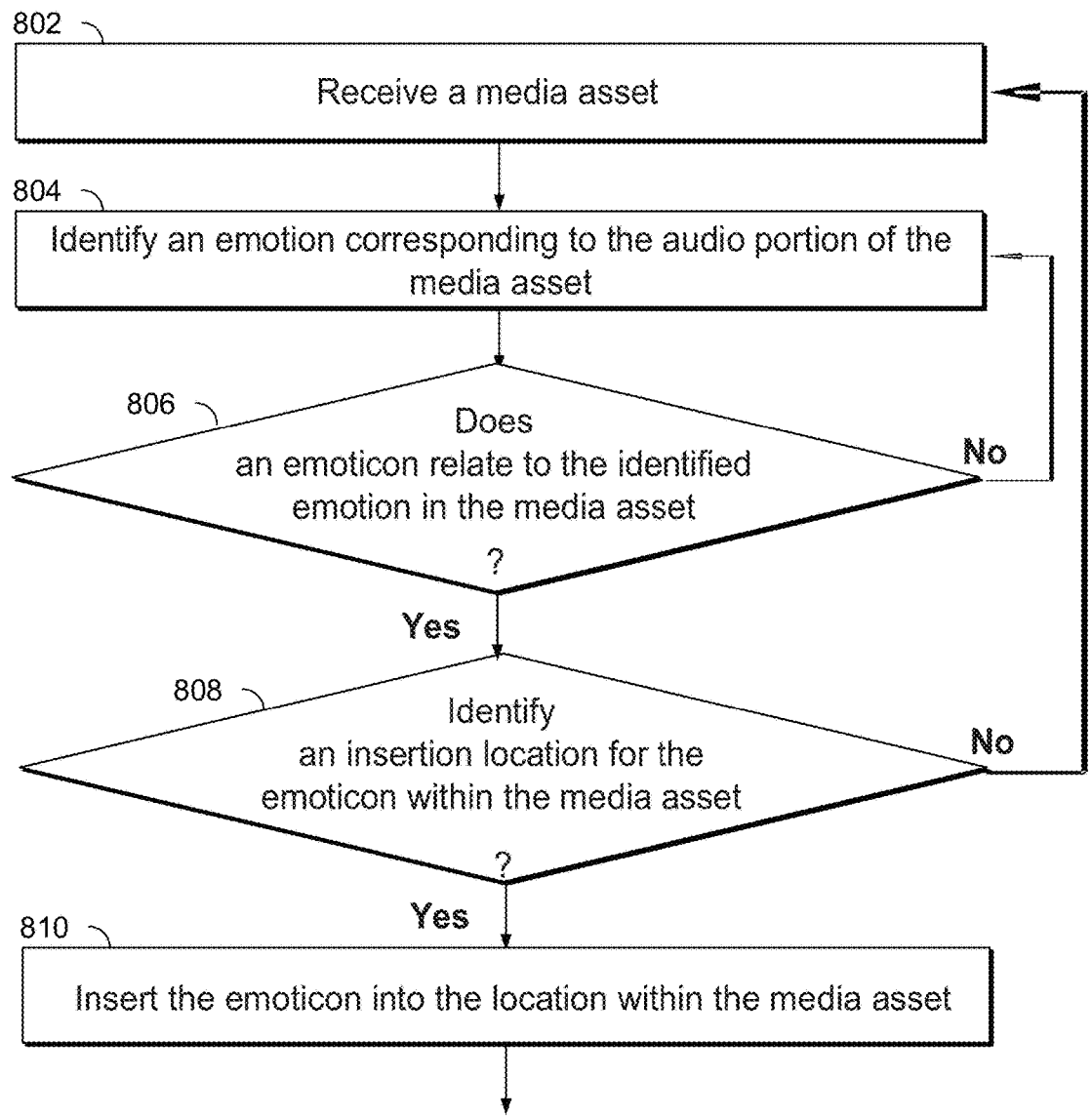
FIG. 8 depicts an illustrative flowchart of a process for inserting an emoticon into a media asset for display in a video frame of the media asset, in accordance with some embodiments of the disclosure.

FIG. 8 depicts an illustrative flowchart of a process for inserting an emoticon into a media asset for display in a video frame of the media asset, in accordance with some embodiments of the disclosure. Process 800 may be executed by control circuitry 412 (e.g., in a manner instructed to control circuitry 412 by the media guidance application). Control circuitry 412 may be part of user equipment (e.g., user equipment 102, which may have the functionality of any or all of user television equipment 514, user computer equipment 516, and/or wireless communications device 522), or of a remote server separated from the user equipment by way of communications network 510.

Process 800 begins at 802, where control circuitry 412 receives an audio portion of a media asset, e.g., from the media guidance data source 504 via communications network 510 in FIG. 5, which indicates the availability of a plurality of media assets. At 804, control circuitry 412, identifies, based on the media asset, an emotion corresponding to the audio portion of the media asset. For example, control circuitry 412 determines an emotion for each respective audio portion of the media asset by considering the actors' facial expressions and body expressions, dialogue in the video segment, tone of the dialogue, and background sound. At 806, control circuitry 412 determines an emoticon based on the emotion determined for each respective audio portion of the media asset. For example, control circuitry 412 obtains a subtitle data file (e.g., 302 in FIG. 3) from the media guidance data source 504 via a communications network 510 in FIG. 5 while receiving the transmission of the media asset. Otherwise, at 806, where control circuitry 412 determines no emoticon relates to the identified emotion of the audio portion of the media asset, process 800 repeats 804, where control circuitry 412 identifies an emotion of the audio portion of the media asset. At 808, control circuitry 412 identifies an insert location for the emoticon within the media asset. For example, the control circuitry 412 determines the video frame has space for an emoticon in the subtitles or in the display along with the display. Otherwise, at 808, where control circuitry 412 determines no location for inserting an emoticon exists, process 800 repeats 802, where control circuitry 412 identifies an emotion of the audio portion of the media asset. At 810, control circuitry 412 generates for display, e.g., via the display circuitry 404 in FIG. 4, at the subtitle region of the video frame of the media asset, the first subtitle data including the identified emoticon.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for inserting emoticons into a media asset, the method comprising:

receiving information describing a plurality of media assets and media guidance data;

determining, based on the media guidance data, a media asset of the plurality of media assets that is likely to be played at a later time;

receiving the media asset likely to be played at a later time, the media asset comprising an audio portion;

determining an emotion descriptor corresponding to the audio portion of the media asset;

identifying, in an emoticon database, an emoticon based on the identified emotion descriptor in the media asset;

calculating, based at least in part on emotion characteristics of the media asset, an emotion score;

comparing the emotion score against a threshold score; and based at least in part on the emotion score being lower than the threshold score, causing to be presented the media asset and the emoticon within the media asset.

2. The method of claim 1, wherein the emotion characteristics of the media asset comprise at least one selected from the following:
a facial expression of actors in the media asset;
a body expression of actors in the media asset;
a dialogue in the audio portion in the media asset;
a tone of the dialogue of the audio portion in the media asset; and
background music of the audio portion in the media asset.

3. The method of claim 1, further comprising:
in response to the emotion score being greater than the threshold score, accessing user profile to determine a user emoticon threshold;
comparing the emotion score to the user emoticon threshold;
in response to the emotion score being lower than the user emoticon threshold, causing to be presented the media asset and the emoticon within the media asset.

4. The method of claim 1, further comprising:
receiving a user emoticon threshold associated with a user profile;
comparing the emotion score to the threshold;
in response to the emotion score being lower than the threshold, causing to be presented the media asset and the emoticon at a location within the media asset.

5. The method of claim 1, wherein the audio portion of the media asset comprises a start time of the audio portion, an end time of the audio portion and an emotion corresponding to the emotion descriptor, and wherein causing to be presented the emoticon into the media asset comprises causing to be presented the emoticon into the media asset from the start time to the end time of the audio portion.

6. The method of claim 1, wherein the emoticon is transparent to minimize covering up content on the media asset.

7. The method of claim 1, further comprising:
receiving instructions to enable the presentation of the emoticon into the media asset.

8. The method of claim 1, wherein determining, based on the media guidance data, the media asset of the plurality of media assets that is likely to be played at a later time is based on one or more selected from the following:
popularity of the media asset of the plurality of media assets that is likely to be played;
a program schedule listing of a channel, wherein the program schedule listing comprises a listing for the media asset of the plurality of media assets that is likely to be played at a later time; and a viewing history of at least one of the plurality of media assets.

9. The method of claim 1, wherein determining the emotion descriptor corresponding to the audio portion of the media asset is based on one or more selected from the following:
metadata of the media asset of the plurality of media assets that is likely to be played at a later time;
an expression of an actor in the media asset of the plurality of media assets that is likely to be played at a later time;
a dialogue of the media asset of the plurality of media assets that is likely to be played at a later time; and
a background sound media asset of the plurality of media assets that is likely to be played at a later time.

10. A system for inserting emoticons into a media asset, the system comprising:
input/output circuitry;
processing circuitry configured to:
receive, via the input/output circuitry, information describing a plurality of media assets and media guidance data;
determine, based on the media guidance data, a media asset of the plurality of media assets that is likely to be played at a later time;
receive, via the input/output circuitry, the media asset likely to be played at a later time, the media asset comprising an audio portion;
determine an emotion descriptor corresponding to the audio portion of the media asset;
identify, in an emoticon database, an emoticon based on the identified emotion descriptor in the media asset;
calculate, based at least in part on emotion characteristics of the media asset, an emotion score;
compare the emotion score against a threshold score; and
based at least in part on the emotion score being lower than the threshold score, cause to be presented the media asset and the emoticon within the media asset.

11. The system of claim 10, wherein the emotion characteristics of the media asset comprise at least one selected from the following:
a facial expression of actors in the media asset;
a body expression of actors in the media asset;
a dialogue of the audio portion in the media asset;
a tone of the dialogue of the audio portion in the media asset; and
background music of the audio portion in the media asset.

12. The system of claim 10, the processing circuitry further configured to:
in response to the emotion score being greater than the threshold score, access user profile to determine a user emoticon threshold;
compare the emotion score to the user emoticon threshold;
in response to the emotion score being lower than the user emoticon threshold, cause to be presented the media asset and the emoticon within the media asset.

13. The system of claim 10, the processing circuitry further configured to:
receive a user emoticon threshold associated with a user profile;
compare the emotion score to the threshold;
in response to the emotion score being lower than the threshold, cause to be presented the media asset and the emoticon within the media asset.

14. The system of claim 10, wherein the audio portion of the media asset comprises a start time of the audio portion, an end time of the audio portion and an emotion corresponding to the emotion descriptor, and wherein causing to be presented the emoticon into the media asset comprises causing to be presented the emoticon into the media asset from the start time to the end time of the audio portion.

15. The system of claim 10, wherein the emoticon is transparent to minimize covering up content on the media asset.

16. The system of claim 10, wherein the processing circuitry is further configured to:
   receive, via the input/output circuitry, instructions to enable the presentation of the emoticon into the media asset.

17. The system of claim 10, wherein to determine, based on the media guidance data, the media asset of the plurality of media assets that is likely to be played at a later time is based on one or more selected from the following:
   popularity of the media asset likely to be played;
   a program schedule listing of a channel, wherein the program schedule listing comprises a listing for the media asset likely to be played at a later time; and
   a viewing history of at least one of the plurality of media assets.

\* \* \* \* \*